(12) United States Patent
Smith et al.

(10) Patent No.: US 11,490,355 B2
(45) Date of Patent: Nov. 1, 2022

(54) SIGNAL GEOLOCATION SYSTEM AND METHOD

(71) Applicant: Multi-Tech Systems, Inc., Mounds View, MN (US)

(72) Inventors: David Thomas Smith, Apple Valley, MN (US); Jason Scott Reiss, Saint Michael, MN (US)

(73) Assignee: Multi-Tech Systems, Inc., Mounds View, MN (US)

( * ) Notice: Subject to any disclaimer, the term of this patent is extended or adjusted under 35 U.S.C. 154(b) by 0 days.

(21) Appl. No.: 16/762,803

(22) PCT Filed: Nov. 9, 2018

(86) PCT No.: PCT/US2018/059928
§ 371 (c)(1),
(2) Date: May 8, 2020

(87) PCT Pub. No.: WO2019/094658
PCT Pub. Date: May 16, 2019

(65) Prior Publication Data
US 2020/0367191 A1    Nov. 19, 2020

Related U.S. Application Data

(60) Provisional application No. 62/584,281, filed on Nov. 10, 2017.

(51) Int. Cl.
*H04W 64/00* (2009.01)
*G01S 5/12* (2006.01)
*G01S 5/14* (2006.01)

(52) U.S. Cl.
CPC ............. *H04W 64/003* (2013.01); *G01S 5/12* (2013.01); *G01S 5/14* (2013.01)

(58) Field of Classification Search
CPC ........... H04W 64/003; G01S 5/12; G01S 5/14
(Continued)

(56) References Cited

U.S. PATENT DOCUMENTS

| 4,535,297 A | 8/1985 | Puckette |
| 7,751,778 B1 * | 7/2010 | Ngan ................... H04B 7/2606 455/414.1 |

(Continued)

FOREIGN PATENT DOCUMENTS

| EP | 2278352 | 1/2011 |
| EP | 2278352 A2 * | 1/2011 ............... G01S 5/04 |

(Continued)

OTHER PUBLICATIONS

International Search Report and Written Opinion of International Application No. PCT/US2018/059928 dated Feb. 19, 2019.

*Primary Examiner* — Matthew C Sams
(74) *Attorney, Agent, or Firm* — Dicke, Billig & Czaja, PLLC

(57) ABSTRACT

One aspect is a network system including a network sewer and a plurality of gateway hosts coupled to the network server and each including a sectorized antenna and defining a plurality of gateway areas. An overlapping gateway grid includes the plurality gateway areas, each gateway area including sectors. The network system includes a plurality of endpoints, each sending and receiving 10 communication signals to and from at least two gateway hosts, and each comprising an oscillator calibrated with a clocking frequency. The network server determines the location of a target endpoint by sending communication signals between two selected sectorized antennas and the target endpoint to determine one sector from each of the two selected sectorized antennas in which the target endpoint is located, 15 and by calculating the time-of-flight for the communication (Continued)

signal to travel between each of the selected sectorized antennas and the target endpoint.

18 Claims, 6 Drawing Sheets

(58) Field of Classification Search
USPC ............................... 455/456.1, 550.1, 562.1
See application file for complete search history.

(56) References Cited

U.S. PATENT DOCUMENTS

| | | | |
|---|---|---|---|
| 8,519,889 B2 * | 8/2013 | Steer | G01S 5/04 342/398 |
| 9,794,095 B2 | 10/2017 | Somin et al. | |
| 10,897,686 B2 * | 1/2021 | Do | G01S 19/23 |
| 2006/0280227 A1 | 12/2006 | Pinkney | |
| 2008/0125144 A1 * | 5/2008 | Ruutu | G01S 5/02 455/457 |
| 2013/0005297 A1 * | 1/2013 | Sanders | H04W 4/029 455/406 |
| 2013/0005349 A1 * | 1/2013 | Sanders | G01S 5/12 455/456.1 |
| 2013/0023286 A1 * | 1/2013 | Soma | H04W 4/02 455/456.1 |
| 2013/0230028 A1 * | 9/2013 | Calcev | H04L 1/0002 370/336 |
| 2014/0213193 A1 * | 7/2014 | Zhang | G01S 5/06 455/67.11 |
| 2014/0334463 A1 * | 11/2014 | Lipman | G01S 5/14 370/338 |
| 2015/0133147 A1 * | 5/2015 | Prechner | G01S 13/767 455/456.1 |
| 2015/0282114 A1 * | 10/2015 | Zhao | H04W 72/0453 455/456.2 |
| 2016/0020932 A1 | 1/2016 | Somin et al. | |
| 2016/0309393 A1 * | 10/2016 | Amini | H04W 48/12 |
| 2018/0006793 A1 * | 1/2018 | Azizi | H04L 5/0037 |
| 2020/0200851 A1 * | 6/2020 | Homsky | H01Q 3/2605 |

FOREIGN PATENT DOCUMENTS

| | | |
|---|---|---|
| EP | 2975814 | 1/2016 |
| WO | WO-2019030464 A1 * | 2/2019 |

\* cited by examiner

SIGNAL GEOLOCATION SYSTEM AND METHOD

CROSS REFERENCE TO RELATED APPLICATION

This Utility Patent Application claims priority under 35 U.S.C. § 371 to International Application Serial No. PCT/US2018/059928, filed Nov. 9, 2018, which claims the benefit of U.S. Provisional Application No. 62/584,281, filed Nov. 10, 2017, which are both incorporated herein by reference.

BACKGROUND

In certain network applications, such as Low Power Wide Area Network (LPWAN) applications, signals are transmitted between endpoint and gateway devices according to established protocols. Often, a single gateway receives multiple signals from multiple endpoints. Because of signal attenuation, and the fact that signals will not always be transmitted directly in the shortest distance between an endpoint and a gateway, it is not always apparent from signal strength, which of multiple received signals is from the closest endpoint. Accordingly, the origin of any particular signal received by a gateway from an endpoint cannot be readily determined. For these and other reasons, there is a need for the present invention.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Figure 1:
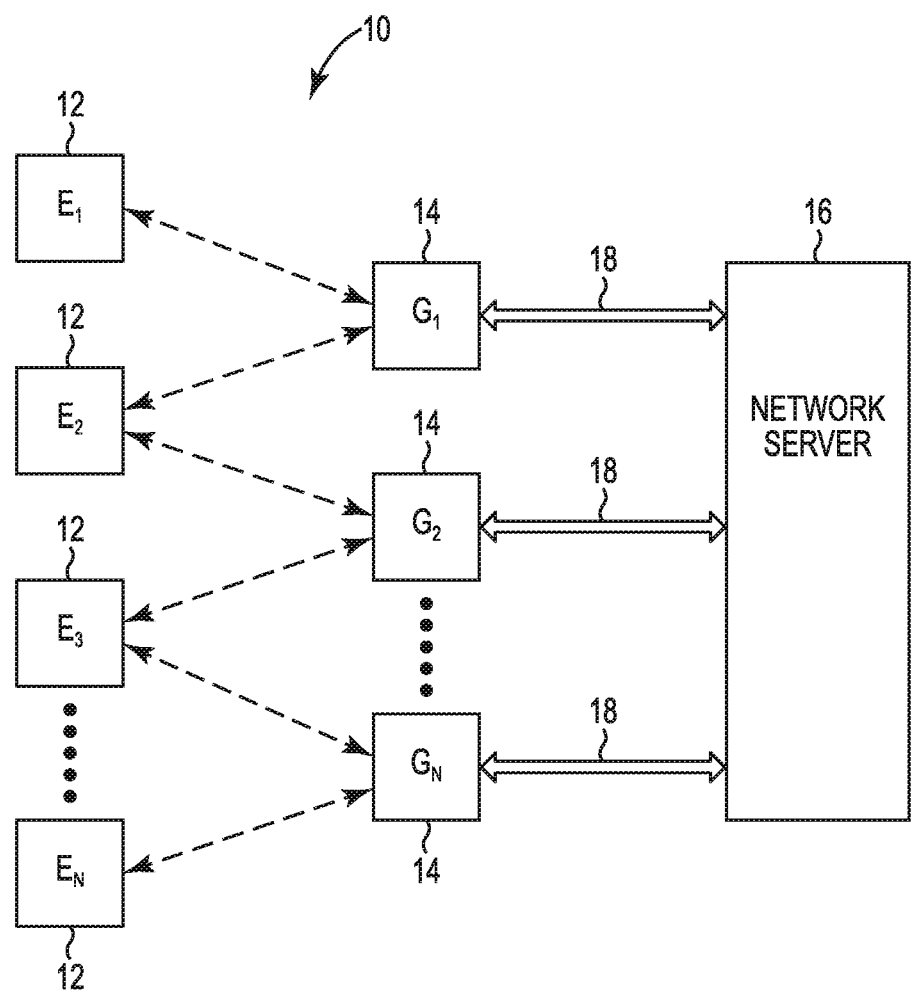
FIG. 1 illustrates a system overview of a Low Power Wide Area Network (LPWAN) in accordance with one embodiment.

FIG. 1 illustrates a system overview of a Low Power Wide Area Network (LPWAN) 10 in accordance with one embodiment. LPWAN 10 includes endpoints 12 ($E_1$, $E_2$, $E_3$ . . . $E_N$), gateway hosts 14 ($G_1$, $G_2$ . . . $G_N$) and network server 16. In some applications, LPWAN 10 has a network architecture in which gateway hosts 14 are transparent bridges relaying messages between endpoints 12, also known as end-devices or sensors, and a network server 16 located in the backend. Gateway hosts 14 are connected to network server 16 via standard IP connections 18.

In one embodiment, each gateway host 14 includes one or more antennas. In this way, each endpoint 12 uses single-hop wireless communication to one or many gateway hosts 14. In one embodiment, LPWAN 10 is a LoRa® or LoRaWAN™ system configuration.

All end-point communication, or communication with endpoints 12, is generally bi-directional, such that each gateway host 14 both transmits communication signals to, and receives signals from, endpoints 12 via the gateway antennas. The architecture of LPWAN 10 is sometime referred to as a "star-of-stars" topology.

In one embodiment, endpoints 12 in LPWAN 10 are battery-operated devices intended for low power operation in order to maximize battery life, while at the same time allowing for substantial wireless transmission distance between endpoints 12 and gateway hosts 14.

Communication signals between endpoints 12 and gateway hosts 14 is spread out on different frequency channels and data rates. The selection of the data rate is a trade-off between communication range and message duration. Due to the spread spectrum technology, communication signals with different data rates do not interfere with each other, and instead create a set of "virtual" channels increasing the capacity of the gateway hosts 14. In one embodiment, LPWAN 10 uses data rates range from 0.3 kbps to 50 kbps. In order to maximize both battery life of endpoints 12 and overall network capacity, network server 16 manages the data rate and RF output for each sensor 12 individually by means of an adaptive data rate (ADR) scheme.

Figure 2:
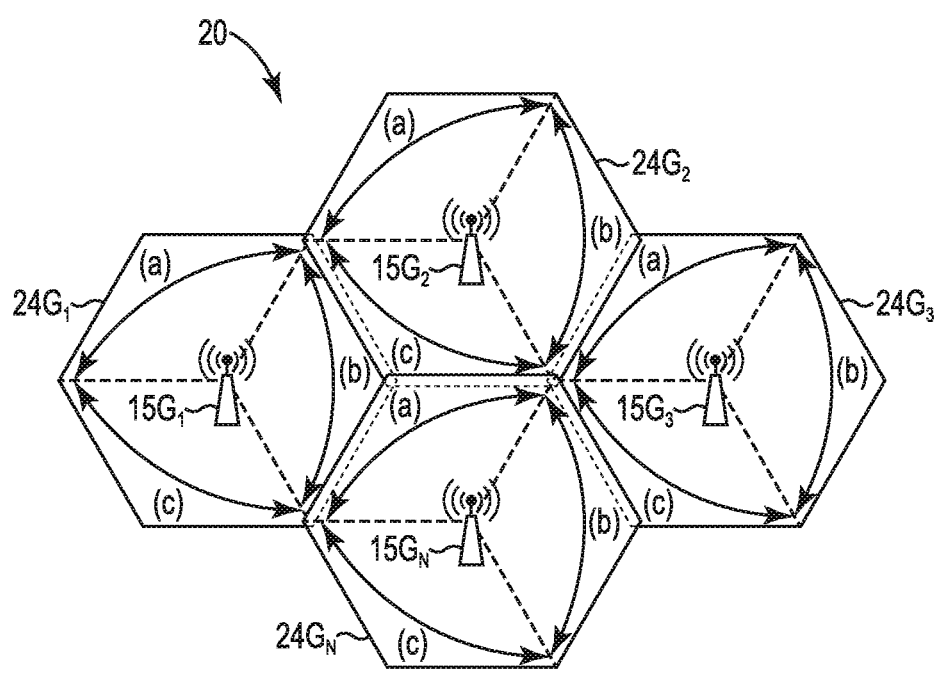
FIG. 2 illustrates the deployment of a plurality of gateway hosts in a gateway grid in accordance with one embodiment.

FIG. 2 illustrates the deployment of a plurality of gateway hosts 14 in a gateway grid 20 for a LPWAN 10. Gateway grid 20 includes a plurality of gateway areas 24, each gateway area $24_{G1}$, $24_{G2}$, $24_{G3}$ . . . $24_{GN}$ corresponding to one gateway host 14 ($G_1$, $G_2$, $G_3$ . . . $G_N$). Each gateway host 14 ($G_1$, $G_2$, $G_3$ . . . $G_N$) includes at least one antenna $15_{G1}$, $15_{G2}$, $15_{G3}$ . . . $15_{GN}$ (In the figure, only the gateway antennas 15 are labeled, rather than also the corresponding gateway host 14, in order to simplify the figure). In FIG. 2, the size of each gateway area $24_{G1}$, $24_{G2}$, $24_{G3}$ . . . $24_{GN}$ is determined by the range of each corresponding antenna $15_{G1}$, $15_{G2}$, $15_{G3}$ . . . $15_{GN}$ in each gateway host 14 ($G_1$, $G_2$, $G_3$ . . . $G_N$). By spacing each gateway host 14 ($G_1$, $G_2$, $G_3$ . . . $G_N$), and accordingly each corresponding antenna $15_{G1}$, $15_{G2}$, $15_{G3}$ . . . $15_{GN}$, relatively close to each other, all positions within the entire gateway grid 20 are within range of at least one antenna 15 of one gateway host 14.

In one embodiment, each antenna $15_{G1}$, $15_{G2}$, $15_{G3}$ ... $15_{GN}$ of each gateway host 14 ($G_1$, $G_2$, $G_3$ ... $G_N$) is configured as a plurality of sectorized antennas. In one embodiment, each gateway antenna $15_{G1}$, $15_{G2}$, $15_{G3}$ ... $15_{GN}$ includes three discrete sectors such that each sector transmits and receives over approximately a 120-degree radius from the antenna $15_{GN}$ in each gateway area $24_{G1}$, $24_{G2}$, $24_{G3}$ ... $24_{GN}$. Accordingly, a first sector antenna is configured to transmit and receive over a first sector (a) of each of gateway areas $24_{G1}$, $24_{G2}$, $24_{G3}$ ... $24_{GN}$, a second sector antenna is configured to transmit and receive over a second sector (b) of each of gateway areas $24_{G1}$, $24_{G2}$, $24_{G3}$ ... $24_{GN}$, and a third sector antenna is configured to transmit and receive over a third sector (c) of each of gateway areas $24_{G1}$, $24_{G2}$, $24_{G3}$ ... $24_{GN}$. The dotted lines within each gateway area $24_{G1}$, $24_{G2}$, $24_{G3}$ ... $24_{GN}$ illustrate the approximate 120-degree radius for each sector of the sectorized antenna. As such, any location within gateway grid 20 is within the range of at least one of the sectorized antennas $15_{G1}$, $15_{G2}$, $15_{G3}$ ... $15_{GN}$ associated with the gateway host 14 ($G_1$, $G_2$, $G_3$ ... $G_N$) in that location.

Figure 3:
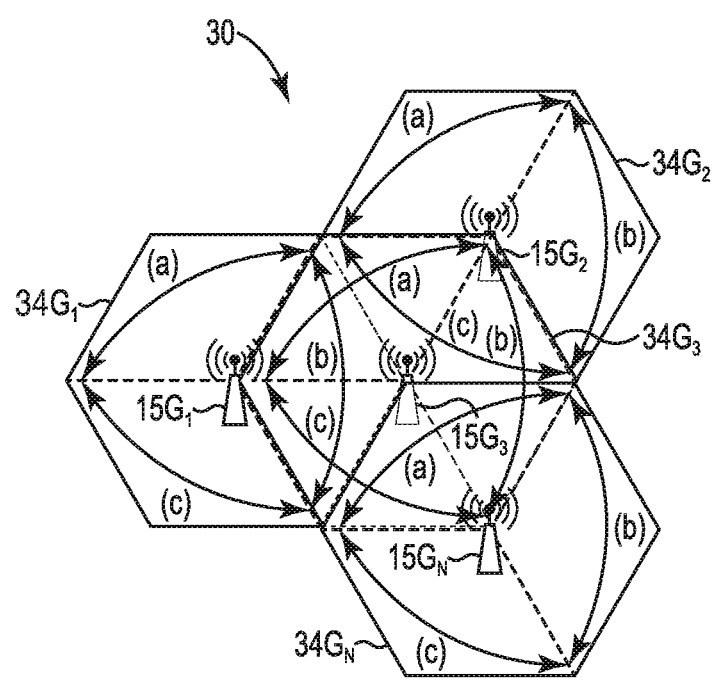
FIG. 3 illustrates the deployment of a plurality of gateway hosts in a overlapping gateway grid in accordance in accordance with one embodiment.

FIG. 3 illustrates the deployment of a plurality of gateway hosts 14 in an overlapping gateway grid 30 for LPWAN 10 in accordance with one embodiment. Similar to gateway grid 20, overlapping gateway grid 30 includes a plurality of gateway areas $34_{G1}$, $34_{G2}$, $34_{G3}$, $34_{GN}$, each gateway area $34_{G1}$, $34_{G2}$, $34_{G3}$, $34_{GN}$ corresponding to one gateway host 14 ($G_1$, $G_2$, $G_3$, $G_N$). Each gateway host 14 ($G_1$, $G_2$, $G_3$, $G_N$) includes at least one gateway antenna $15_{G1}$, $15_{G2}$, $15_{G3}$, $15_{GN}$. As described previously, the size of each gateway area $34_{G1}$, $34_{G2}$, $34_{G3}$, $34_{GN}$ is determined by the range of each corresponding antenna $15_{G1}$, $15_{G2}$, $15_{G3}$, $15_{GN}$ in each gateway host 14 ($G_1$, $G_2$, $G_3$, $G_N$). Each gateway area $34_{G1}$, $34_{G2}$, $34_{G3}$, $34_{GN}$ of overlapping gateway grid 30 overlaps at least a portion of at least one other gateway area $34_{G1}$, $34_{G2}$, $34_{G3}$, $34_{GN}$. As such, in one embodiment, any location within overlapping gateway grid 30 is within range of at least two gateway antennas $15_{G1}$, $15_{G2}$, $15_{G3}$, $15_{GN}$.

FIG. 3 illustrates a simplified overlapping gateway grid 30, including four exemplary gateway areas $34_{G1}$, $34_{G2}$, $34_{G3}$, $34_{GN}$ in order to clarify the illustration. Other embodiments of overlapping gateway grid 30 can contain hundreds or thousands of gateway hosts $14G_N$ with the same amount of corresponding gateway antennas $15_{GN}$. Similar to gateway grid 20, the four illustrated gateway areas $34_{G1}$, $34_{G2}$, $34_{G3}$, $34_{GN}$ of gateway grid 30 respectively include first, second, third and fourth sectorized antennas $15_{G1}$, $15_{G2}$, $15_{G3}$ and $15_{GN}$, and each accordingly have first, second and third sectors (a), (b), and (c), each having a range of approximately 120 degrees.

In the illustration, the overlapping nature of gateway areas $34_{G1}$, $34_{G2}$, $34_{G3}$, $34_{GN}$ is exemplified, and will be explained further, by first, second and third sectors (a), (b) and (c) of third antenna $15_{G3}$. First sector (a) of third antenna $15_{G3}$ overlaps with part of third sector (c) of second antenna $15_{G2}$ and with part of second sector (b) of first antenna $15_{G1}$. Second sector (b) of third antenna $15_{G3}$ overlaps with part of third sector (c) of second antenna $15_{G2}$ and with part of first sector (a) of fourth antenna $15_{GN}$. Third sector (c) of third antenna $15_{G3}$ overlaps with part of first sector (a) of fourth antenna $15_{GN}$ and part of second sector (b) of first antenna $15_{G1}$. Where more gateway areas 34 are included in overlapping gateway grid 30, they can be arranged similarly to have similarly overlapping sectors.

In one embodiment, LPWAN 10 determines the physical location, or geolocation, of endpoints 12 using overlapping gateway grid 30, taking advantage of a single target endpoint 12 being located in sectors of two different overlapping gateway areas 34. In order to determine the location of endpoint 12, LPWAN 10 uses bi-directional communication signals between endpoints 12 and gateway hosts $14G_N$, via the gateway antennas $15_{GN}$, to calculate the time-of-flight (tof) for the communication signals. Furthermore, using the overlapping gateway grid 30, LPWAN 10 determines direction of the flight for the communication signals. Using the time-of-flight calculation combined with the direction of the flight determination, LPWAN 10 can accurately geolocate the endpoint 12.

Figure 4:
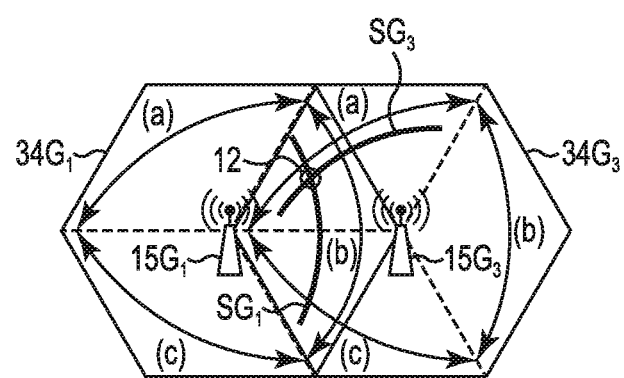
FIG. 4 illustrates two overlapping gateway hosts and a located endpoint in accordance with one embodiment.

FIG. 4 illustrates two exemplary gateway areas $34_{G1}$ and $34_{G3}$ from overlapping gateway grid 30 in accordance with one embodiment. Although overlapping gateway grid 30 includes many more gateway areas 34, just two are illustrated to simplify the example. Endpoint 12 is located in overlapping sectors of gateway areas $34_{G1}$ and $34_{G3}$. Specifically, endpoint 12 is located in second sector (b) of first gateway area $34_{G1}$, and in first sector (a) of third gateway area $34_{G3}$. Because antennas $15_{G1}$ and $15_{G3}$ are sectorized, LPWAN 10 can accurately determine the direction of endpoint 12 using just these two antennas, and accordingly, LPWAN 10 can determine direction using just two gateway hosts 14. Then, by calculating the distance of endpoint 12 from the respective antennas $15_{G1}$ and $15_{G3}$, LPWAN 10 can accurately determine precise location.

Because communication signals between endpoint 12 and antenna 15 radiate generally in a signal arc (S) within any given sector, the distance between the endpoint 12 and antenna 15 can be calculated by finding the distance between the antenna 15 and a signal arc (S), which passes through endpoint 12. Two such arcs $S_{G1}$ and $S_{G3}$, respectively from antennas $15_{G1}$ and $15_{G3}$, are each illustrated passing through endpoint 12 in FIG. 4. Determining the location of the intersection of the two arcs $S_{G1}$ and $S_{G3}$, also locates the target endpoint 12.

Figure 5:
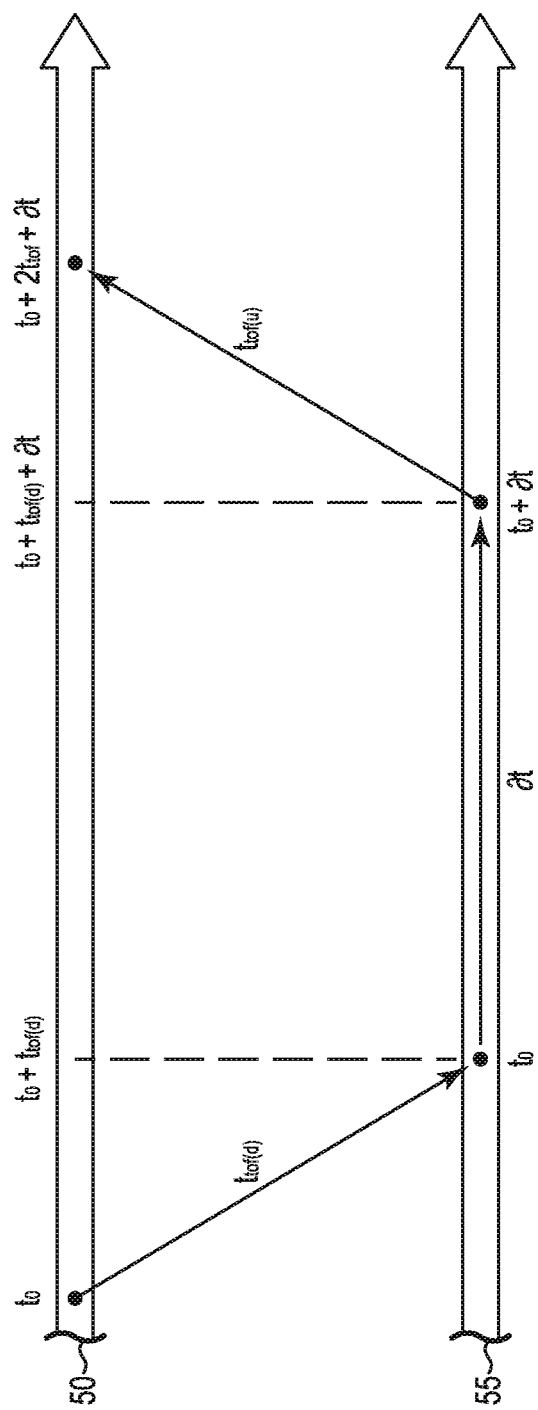
FIG. 5 is illustrates time sequencing for time-of-flight calculations in accordance with one embodiment.

In one embodiment, in order to determine the distance between a signal arc (S) and a respective antenna $15G_N$, time-of-flight calculations are used for the communication signal. FIG. 5 illustrates time sequencing for calculating time-of-flight in order to determine the distance between endpoint 12 and the antenna 15 according to one embodiment. Both the gateway 14 and the endpoint 12 have an independent track of time. In one embodiment, each endpoint 12 is integrated with a highly accurate clock. In one embodiment, the clock in endpoint 12 is an oscillator that is calibrated with software to control a highly accurate clocking frequency. Because gateway 14 is directly coupled to network server 16, it uses a network clock. As such, there is a network clock timeline 50, represented in the upper portion of FIG. 5, and an endpoint clock timeline 55, represented in the lower portion of FIG. 5.

In one embodiment, the process for time-of-flight calculation begins when network 16 sends a first communication signal to endpoint 12 via gateway antenna 15 at time $t_0$, representing the network time when the first communication signal is sent. The first communication signal includes a time packet that stores this sent time $t_0$. The first communication signal including the time packet is then received by endpoint 12. The time at which endpoint receives the packet containing sent time $t_0$, is represented on timeline 55, but because the first communication signal including the time packet will take time to transport from antenna 15 to endpoint 12, the network time relative to point in time when endpoint 12 receives the packet is:

$$t_0 + t_{tof(d)}, \qquad\qquad 1.0)$$

where $t_{tof(d)}$ is the time-of-flight for the first communication signal with the time packet to travel down from the antenna 15 to the endpoint 12.

Once received, endpoint 12 will then prepare a time packet to be sent back up to the gateway antenna 15 in a second communication signal. The period of time from when endpoint 12 receives the packet containing time sent $t_0$ until the packet is sent back up to gateway antenna 15 is represented by prepare time a ∂t. Because endpoint 12 is equipped with a highly accurate clock, prepare time a ∂t is accurately recorded by endpoint 12, and then added to the data packet that is sent back up to gateway antenna 15 in the second communication signal. As such, the time packet that is send up from endpoint 12 to gateway antenna includes the information in expression 1.0, that is, $t_0+∂t$. Again, because the second communication signal including the time packet will take time to transport up from endpoint 12 to antenna 15, the network time relative to when gateway antenna 15 receives the packet in the second communication signal is:

$$t_0+t_{tof(d)}+∂t+t_{tof(u)}, \qquad 2.0)$$

where $t_{tof(u)}$ is the time-of-flight for the second communication signal with the time packet to travel up from the endpoint 12 to the antenna 15.

In one embodiment, it is assumed that the time-of-flight for the first communication signal is the same down to the endpoint 12 as it is for the second communication signal back up from the endpoint 12. Accordingly, the time, expressed as $t_{rec}$, that the network receives the communication after it is initially sent from the gateway 14 via antenna 15 to the endpoint 12 and back up to the antenna 15 can also be expressed as:

$$t_{rec}=t_0+2t_{tof}+∂t, \qquad 3.0)$$

where $t_{tof}$ represents the time-of-flight for both the first communication signal with the time packet to travel down from the antenna 15 to the endpoint 12 and for the second communication signal with the time packet to travel up from the endpoint 12 to the antenna 15.

With this information contained in the data packet of the second communication signal received by gateway 14 via antenna 15, gateway 14 can calculate time-of-flight $t_{tof}$ for the first and second communications, from which the distance between the antenna 15 and the endpoint 12 can be derived. In order to calculate time time-of-flight $t_{tof}$ for the communications, equation 3.0 above is solved for time-of-flight $t_{tof}$ as follows:

$$t_{tof}=(t_{rec}-t_0-∂t)/2 \qquad 4.0)$$

Because it is known that the communication signals travel is electromagnetic propagation at the speed of light, which travels 1 meter in 3.34 ns, the distance between the endpoint 12 and the gateway 14 is:

$$D_{E-G}=(t_{rec}-t_0-∂t)/2*1 \; m/3.34 \; ns, \qquad 5.0)$$

where $D_{E-G}$ is the distance between the endpoint 12 and the gateway 14.

As illustrated in FIG. 4, any endpoint 12 in overlapping gateway areas, such as gateway areas $34_{G1}$ and $34_{G3}$, is within one sector of each gateway area. As previously discussed, endpoint 12 of FIG. 4 is located in second sector (b) of gateway area $34_{G1}$, and in first sector (a) of gateway area $34_{G3}$. Accordingly, the distance between antenna $15_{G1}$ and target endpoint 12 is calculated using equation 5.0 and the distance between antenna $15_{G3}$ and target endpoint 12 is also calculated using equation 5.0.

Furthermore, because the location of each gateway 14 and gateway antenna 15 is known, the relative location of the target endpoint 12 can be calculated by determining the intersection of the signal arcs $S_{G1}$ and $S_{G3}$ of the communication signals between endpoint 12 and antenna 15.

Figure 6:
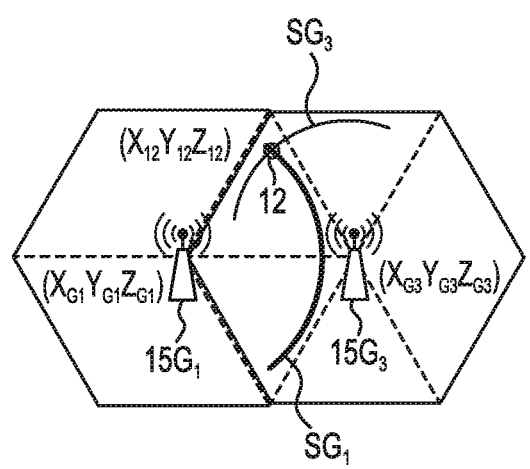
FIG. 6 illustrates two overlapping gateway hosts and a located endpoint in accordance with one embodiment.

FIG. 6 illustrates the intersection of the signal arcs $S_{G1}$ and $S_{G3}$ passing through target endpoint 12. The radius of a sphere lying respectively on each of these arcs $S_{G1}$ and $S_{G3}$ can be calculated by using equation 5.0 above:

$$r_{G1}=(t_{rec}-t_0-∂t)/2*1 \; m/3.34 \; ns; \; and \qquad 6.1)$$

$$r_{G3}=(t_{rec}-t_0-∂t)/2*1 \; m/3.34 \; ns, \qquad 6.2)$$

where $r_{G1}$ is the radius of a sphere having a surface passing through endpoint 12 and having a center point at gateway antenna $15_{G1}$ and $r_{G3}$ is the radius of a sphere having a surface passing through endpoint 12 and having a center point at gateway antenna $15_{G3}$. The coordinates of the respective center points of such spheres are identified on an xyz-axis as $(X_{G1}, Y_{G1}, Z_{G1})$ and $(X_{G3}, Y_{G3}, Z_{G3})$. The coordinates of the target endpoint 12 is identified on an xyz-axis as $(X_{12}, Y_{12}, Z_{12})$. Because the location of the gateway antenna is known to the network server 16 when LPWAN 10 is deployed, and the radius of the spheres has been calculated using equation 5.0 above, the location of the endpoint 12 can be calculated by using the calculation for the intersection of two spheres:

$$(r_{G1})^2=(X_{G1}+X_{12})^2+(Y_{G1}+Y_{12})^2+(Z_{G1}+Z_{12})^2; \; and \qquad 7.1)$$

$$(r_{G3})^2=(X_{G3}+X_{12})^2+(Y_{G3}+Y_{12})^2+(Z_{G3}+Z_{12})^2 \qquad 7.1)$$

By solving equations 7.1 and 7.2 for $(X_{12}, Y_{12}, Z_{12})$, the xyz-axis coordinates for the location of endpoint 12 is determined.

Because LPWAN 10 employs an overlapping gateway grid 30 with sectorized antennas $15_{GN}$, it can accurately calculate geolocations of target endpoints 12 using just two gateway hosts 14. Prior systems using other configurations require more gateways and more complex calculations.

Also, using sectorized antennas $15_{GN}$ helps to reduce, and in some cases eliminated multipath effects that are common is other systems. In any signal communication between endpoints and antennas, the precise path of the communication is difficult to predict, and will often not be in a straight line between the two. For example, if there is a structure, such as a building, between the endpoint and antenna, the communication path will bounce off the structure and other objects while traveling between the endpoint and antenna. When non-sectorized antennas are used, with a single antenna radiating communication signals in a 360 degree radius, it is more likely for this multipath communication to occur. By using sectorized antennas, LPWAN 10 decreases this multipath effect.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A network system comprising:
   a network server;
   a plurality of gateway hosts coupled to the network server and each comprising a sectorized antenna and each comprising a gateway area;
   an overlapping gateway grid comprising a plurality of gateway areas, each gateway area including sectors;
   a plurality of endpoints, each sending and receiving communication signals to and from at least two gateway hosts, and each comprising an oscillator calibrated with a clocking frequency;
   wherein the network server determines the location of a target endpoint among the plurality of endpoints by sending communication signals between two selected sectorized antennas and the target endpoint to determine one sector from each of the two selected sectorized antennas in which the target endpoint is located, and by calculating the time-of-flight for the communication signal to travel between each of the selected sectorized antennas and the target endpoint; and
   wherein the first and second gateway hosts are in an overlapping gateway grid; and
   wherein the network system is configured such that the distance between the target endpoint and the first sectorized antenna is:

$$D_{E-G} = (t_{rec} - t_0 - \partial t)/2 * 1\ m/3.34\ ns,$$

where $D_{E-G}$ is the distance between the target endpoint and the first sectorized antenna, where $t_{rec}$ is the time when the second communication signal is received from the target endpoint tree by the first sectorized antenna, where $t_0$ is the time when the first communication signal is sent by the first sectorized antenna to the target endpoint, where $t_{tof}$ is the time-of-flight for the first communication signal from the first sectorized antenna to the target endpoint, and where $\partial t$ is the period of time from when the target endpoint receives the first communication signal until it sends the second communication signal.

2. The network system of claim 1, wherein each sector of each gateway area within the overlapping gateway grid overlaps with a sector of at least one other gateway area.

3. The network system of claim 1, wherein a first communication signal from one of the selected sectorized antenna contains an indication of when the signal was sent from the sectorized antenna to the target endpoint.

4. The network system of claim 1, wherein a second communication signal from the target endpoint one of the selected sectorized antenna contains an indication of the time-of-flight of the second communication signal.

5. The network system of claim 1, wherein the location of the target endpoint is determined using only two gateway hosts and corresponding two gateway antennas.

6. The network system of claim 1, wherein the network server stores the location coordinates of each gateway host and each respective sectorized antenna such that the location of the target endpoint is determined by its relative location to two gateway hosts.

7. The network system of claim 1, wherein the location of the target endpoint is determined using an assumption that the time-of-flight for the first communication signal from the sectorized antenna to the target endpoint is the same as the time-of-flight for the second communication signal from the target endpoint to the sectorized antenna.

8. The network system of claim 1, wherein each sectorized antenna includes three discrete sectors such that each sector transmits and receives over approximately a 120-degree radius from the antenna in each gateway area.

9. A method of determining the location of a target endpoint in a network system comprising:
   sending a first communication signal from a first sectorized antenna of a first gateway host to the target endpoint;
   receiving the first communication signal at the target endpoint and sending a second communication signal from the target endpoint to the first sectorized antenna, the second communication signal including a first indication of time-of-flight of the first or second communication signal between the target endpoint and the first sectorized antenna;
   sending a third communication signal from a second sectorized antenna of a second gateway host to the target endpoint;
   receiving the third communication signal at the target endpoint and sending a fourth communication signal from the target endpoint to the second sectorized antenna, the fourth communication signal including a second indication of time-of-flight of the third or fourth communication signal between the target endpoint and the second sectorized antenna;
   determining the location of the target endpoint by calculating the distance between the target endpoint and the first sectorized antenna using the first indication of time-of-flight and the distance between the target endpoint and the second sectorized antenna using the second indication of time-of-flight;
   wherein the first and second gateway hosts are in an overlapping gateway grid; and
   wherein the distance between the target endpoint and the first sectorized antenna is calculated using:

$$D_{E-G} = (t_{rec} - t_0 - \partial t)/2 * 1\ m/3.34\ ns,$$

where $D_{E-G}$ is the distance between the target endpoint and the first sectorized antenna, where tree is the time when the second communication signal is received from the target endpoint by the first sectorized antenna, where $t_0$ is the time when the first communication signal is sent by the first sectorized antenna to the target endpoint, where $t_{tof}$ is the time-of-flight for the first communication signal from the first sectorized antenna to the target endpoint, and where $\partial t$ is the period of time from when the target endpoint receives the first communication signal until it sends the second communication signal.

10. The method of claim 9, wherein the network system stores the location coordinates of each of the first and second gateway hosts and determines the location of the target endpoint by its relative location to the first and second gateway hosts.

11. The method of claim 9, wherein calculating the distance between the target endpoint and the first sectorized antenna includes averaging the time-of-flight of the first communication signal between the first sectorized antenna and the target endpoint and the time-of-flight of the second communication signal between the target endpoint and the first sectorized antenna.

12. The method of claim 9, wherein calculating the distance between the target endpoint and the second sectorized antenna includes averaging the time-of-flight of the third communication signal between the second sectorized antenna and the target endpoint and the time-of-flight of the fourth communication signal between the target endpoint and the second sectorized antenna.

13. The method of claim 9, wherein the network system comprises a plurality of gateway hosts each comprising a sectorized antenna and each comprising a gateway area.

14. The method of claim 9, wherein the network system comprises an overlapping gateway grid comprising a plurality of gateway areas, each gateway area including sectors, and each sector of each gateway area within the overlapping gateway grid overlaps with a sector of at least one other gateway area.

15. The method of claim 9, wherein the first communication signal contains an indication of when the signal was sent from the first sectorized antenna to the target endpoint.

16. The method of claim 9, wherein a second communication signal contains an indication of the time-of-flight of the second communication signal.

17. The method of claim 9, wherein the determination of the location of the target endpoint is calculated using only two gateway hosts and corresponding two gateway antennas.

18. The method of claim 9, wherein each sectorized antenna includes three discrete sectors such that each sector transmits and receives over approximately a 120-degree radius from the antenna in each gateway area.

* * * * *